March 22, 1960 P. PROFOS 2,929,390
METHOD AND MEANS FOR CONTROLLING A MOTOR OPERATOR
Filed Feb. 9, 1959 2 Sheets-Sheet 1

INVENTOR.
PAUL PROFOS.
BY K. A. Mayr
ATTORNEY.

United States Patent Office 2,929,390
Patented Mar. 22, 1960

2,929,390

METHOD AND MEANS FOR CONTROLLING A MOTOR OPERATOR

Paul Profos, Winterthur, Switzerland, assignor to Sulzer Freres, S.A., Winterthur, Switzerland, a corporation of Switzerland Application February 9, 1959, Serial No. 792,135

Claims priority, application Switzerland February 17, 1957

5 Claims. (Cl. 137—82)

The invention relates to a method for controlling a motor operator which is actuated by at least two independent signals whereby either one or the other actuating signal is operatively connected with the motor operator. The invention is also concerned with an apparatus suitable for carrying out the method.

In conventional control systems in which actuation of the motor operator is temporarily taken over by a second actuating signal after a first actuating signal has been rendered inactive, whereby the second signal may originate outside of the control system in second control or adjusting system or may be manually produced, the motor operator is spasmodically actuated causing a violent and undesired momentary disturbance of equilibrium of the controlled plant, for example, when changing from the automatically to the manually produced signal.

It is an object of the invention to provide a method and an apparatus for selectively actuating a motor operator by at least two independent signals which avoid the disadvantages of conventional methods and devices of this type by providing an additional auxiliary signal overlaying the temporarily inactive signal at least during the time the inactive signal is reactivated whereby the auxiliary signal compensates at least a major part of the difference between the active signal and the inactive signal.

The system may be further improved by gradually reducing the effect of the auxiliary signal according to a predetermined time schedule, after change of the main actuating signals.

Another object of the invention resides in the provision of the control mechanism of the type in which the final control element is actuated by a motor operator which is regulated by at least two independent signals produced by two different measuring means of which only one signal is operatively connected at a time to the motor operator while the other signal is disconnected from the motor operator. A summing device is interposed in the conductor for at least one of said signals for superimposing an auxiliary signal on the conducted signal. The two conductors for the two independent signals are connected to a change-over or switch device which connects one conductor at a time with the motor operator. This change-over device is operatively associated with at least one auxiliary controller which is responsive to the difference between the energy of the signal transmitted by the change-over device to the motor operator and the energy of the signal which is not transmitted and which auxiliary controller produces an auxiliary signal which is transmitted to the summing device in the conductor for the signal which is not transmitted to the motor operator so that at the moment the change-over device is actuated for switching the motor operator to the conductor which was previously disconnected the energy of the signals in both conductors is at least approximately the same.

If the control mechanism includes more than two measuring means at least two auxiliary controlling means may be provided.

In certain cases it may be of advantage to provide the auxiliary controlling means with an accumulator for storing energy produced by the auxiliary signal. This accumulator may be provided with means for gradually discharging the stored auxiliary signal energy after inactivation of the auxiliary controlling means.

The novel features which are considered characteristic of the invention are set forth with particularity in the appended claims. The invention itself, however, and additional objects and advantages thereof will best be understood from the following description of embodiments thereof when read in connection with the accompanying drawing, in which:

Fig. 1 illustrates a most simple control mechanism according to the invention wherein compensation of two independent actuating signals is possible only in one direction, i.e., wherein an auxiliary signal can be superimposed only on one of the two independent actuating signals.

Figure 1:
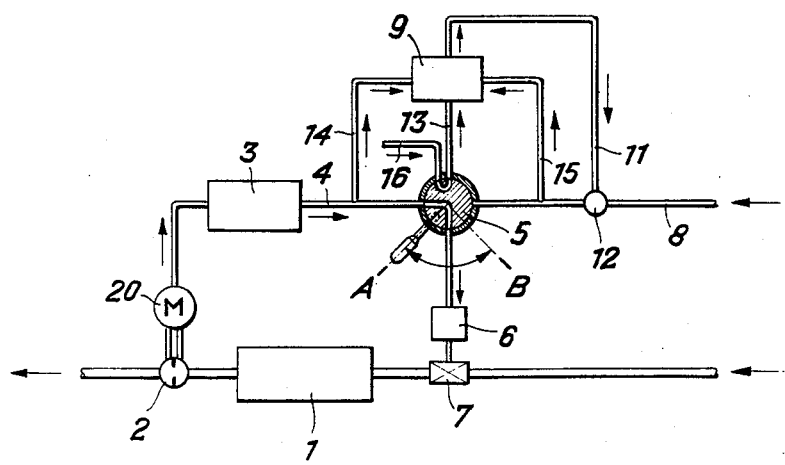
Fig. 1 is a diagrammatic part sectional illustration of an apparatus according to the invention.

Numeral 1 designates the plant or process to be controlled. In the most simple embodiment, the plant to be controlled may be, for example, a pipe through which flows a liquid and at the one end of which a regulating valve is arranged whereas at the other end a measuring means is provided for measuring the amount of liquid flowing through the pipe. The plant to be controlled may be, for example, a building provided with heating means whereby the interior temperature of the building is maintained at a predetermined value by an automatic controller independent of the exterior temperature.

In the illustrated example a measuring means 2 including a measuring device 20 is provided downstream of the plant 1. The values measured by the device 20 are transformed to relatively powerful signals in an amplifier 3. The latter may also act as a correcting device for producing a predetermined relation between the measured value and the signal to which the value is transformed. This relation may be linear. Alternatively, a linear increase of the measured value may produce a quadratic increase of the produced signals. The signal is transmitted from the amplifier 3 through a conductor 4 to a change-over or switch device 5 wherefrom the signal is transmitted to a motor operator 6 which operates a final control element 7, for example a valve, of the plant 1, if the device 5 is in the position shown in Fig. 1.

The change-over device 5 receives a second signal from the outside through a conductor 8. Numeral 9 designates an auxiliary controller which is connected to the conductor 4 by a conductor 14 and compares signals produced in the amplifier 3 with signals in the conductor 8 to which the auxiliary controller 9 is connected by a conductor 15. The controller 9 produces an auxiliary signal corresponding to the result of the aforedescribed comparison. The auxiliary signal is transmitted through an auxiliary conductor 11 to a summing device 12 which is interposed in the conductor 8. The sum of the auxiliary signal and the signal transmitted in the conductor 8 is equal to the signal in the conductor 4.

After moving the change-over device 5 from the position A to the position B in Fig. 1, for example by hand, the signal arriving through the conductor 4 and transmitted to the motor operator 6 is replaced by a signal which is initially equal to the sum of the signals in the conductor 8 and in the auxiliary signal conductor 11. There is, therefore, immediately after the actuation of the change-over device no change in the operation of the motor operator 6. Placement of the device 5 from the position A into the position B, however, simultaneously stops supply of auxiliary energy to the auxiliary controller through conductors 16 and 13 whereupon the final control element 7 is actuated exclusively in dependence on the signal received from the conductor 8. It is obvious that the device can easily be so designed that the energy of the auxiliary signal is gradually reduced to zero within a predetermined period of time.

Figure 2:
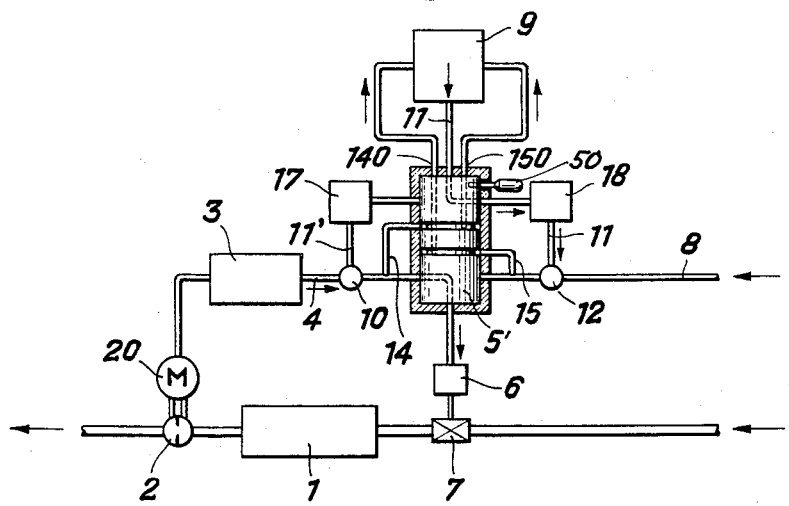
Fig. 2 is a diagrammatic part sectional illustration of a modified apparatus according to the invention.

Fig. 2 illustrates a system in which one auxiliary controller 9 compensates the difference of independent signals in two directions. In this case, the change-over device 5' also serves for changing the connection of conductors 140 and 150 corresponding to conductors 14 and 15 in Fig. 1 to the auxiliary controller 9. The change-over device 5' is in the form of a cylindrical valve which can be rotated by manipulation of a handle 50. The arrangement shown in Fig. 2 includes two auxiliary signal conductors 11 and 11', the conductors being provided with signal energy accumulators 17 and 18, respectively. The energy accumulators may be adapted to gradually reduce the stored energy after resetting of the change-over device 5'. A suitable arrangement will be described below in connection with the description of Fig. 3. A summing device 10 is interposed in the conductor 4. The operation of the device shown in Fig. 2 is analogous to that shown in Fig. 1. However, whereas the apparatus shown in Fig. 1 affords compensation of the difference between signals in line 8 and in line 4 only prior to moving the change-over device from the position in which it connects the line 4 to the motor operator 6 to the position in which it connects line 8 to the motor operator 6, the apparatus shown in Fig. 2 also compensates the difference between the signals in line 4 and in line 8 prior to moving the change-over device in the opposite direction.

Figure 3:
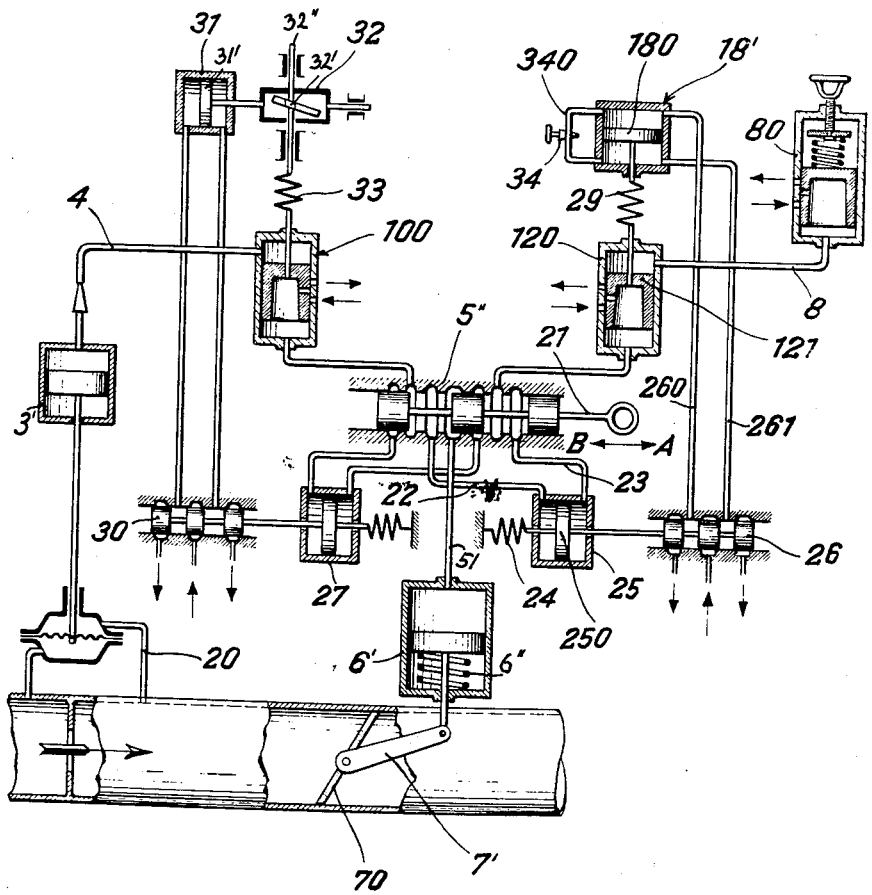
Fig. 3 is a diagrammatic part sectional illustration of an apparatus for carrying out the method according to the invention by means of hydraulic devices.

Fig. 3 shows a control system according to the invention implemented by hydraulic means. Analogous to the arrangement shown in Fig. 2 either a signal produced by a primary element 3' is conducted through a signal conductor 4, in which a summing device 100 is interposed, or a signal produced by a manually operated element 80 is conducted through a signal conductor 8, in which a summing device 120 is interposed, to a change-over device 5''. Depending on the position of the latter, a motor operator 6' connected to the device 5'' by a conduit 51 actuates a final control element 7' against the action of a spring 6''. In the illustrated example the element 7 actuates a flap valve 70. If the valve 21 forming part of the change-over device 5'' is in the position A, which is the position shown in Fig. 3, the signal produced by the primary element 3' acts through the conductor 4 and the summing device 100 on the motor operator 6'. This signal also acts through a conductor 22 on the left side of a piston 250 forming part of a comparing device 25, whereas the signal produced by the hand operated device 80 and transmitted through the conductor 8 in which the summing device 120 is interposed acts through a conductor 23 on the right side of the piston 250. If one of the signals acting on the piston 250 is greater, the piston moves until there is equilibruim with the force produced by a spring 24. A piston valve 26 is connected to and moves simultaneously with the piston 250. If there is no load on the piston 250, it is held in the neutral position by the spring 24. The piston valve 26 controls, in a conventional manner, flow of a pressure fluid in pipes 260 and 261 which fluid actuates a piston 180 forming part of a dashpot device 18' which produces an auxiliary signal corresponding to the difference between the energy of the signal received from the device 100 and the signal received from the device 120. The piston 180 is connected by means of a spring 29 with a piston 121 forming part of the summing device 120 which produces a signal which is equal to that produced by the summing device 100.

If the valve 21 is moved from the position A to the position B, the position of the motor operator 6' is not changed because the energy of the signal received from the summing device 120 is the same as the energy of the signal produced in the summing device 100 which acted on the motor operator previously to the change of the position of the valve 21. Depending on the adjustment of a throttle valve 34 in a by-pass pipe 340 of the dashpot device 18' the tension of the spring 29 will be gradually reduced and, consequently, the pressure produced in the summing device 120 will also be reduced so that the motor operator 6' will gradually move towards the position which corresponds to the signal produced by the hand operated device 80.

The comparing device 25, which actuates the valve 26, and the dashpot device 18' with the energy accumulating spring 29 form an auxiliary controller for the signal in the conductor 8. A comparing device 27 actuating a valve 30 and corresponding to the device 25, 26 controls the movement of a piston in an auxiliary signal producing device 31. This device is a modification of the auxiliary signal producing device 18'. A piston 31' of the device 31 actuates a slide 32' slidable in a slot of a guide 32 which is connected to the piston 31'. The slide 32' is made fast on a rod 32'' which is connected with one end of an energy accumulating spring 33, the other end of the spring being connected to a slide valve forming part of the summing device 100. The device 32, 32', 32'' transmits motion of the guide 32 to one end of the spring 33 but cannot transmit motion in the reverse direction. If the comparing device 27 is not in operation because the change-over valve 21 is moved from the position B to the position A, which is the one shown in the drawing, the upper end of the energy accumulating spring 33 remains in its last position until the device 27 is once more operated by movement of the change-over valve 21 from position A to position B. Due to the self-locking connection between the summing device 100 and the auxiliary signal producing device 31 the auxiliary signal added in the summing device 100 to the signal in conductor 4 remains unchanged. The functions of the auxiliary signal producing devices 18' and 31 with the energy accumulating springs 29 and 33 correspond to the signal accumulators 17 and 18 of the arrangement shown in Fig. 2. There is, however, a difference between the auxiliary signal producing and accumulating device 18', 29 and 31, 33: The dashpot device 18' is provided with an adjustable throttle 34 in a by-pass pipe 340 which affords gradual reduction of the auxiliary signal after inactivation of the comparing device 25, whereas the signal energy accommulated in the spring 33 remains unchanged after inactivation of the comparing device 27.

The invention is not limited to the hydraulic implementation shown in Fig. 3. The new control method can also be carried out by mechanical means or by electrical means, or a combination of mechanical, hydraulic and electrical means. It is not necessary that the auxiliary signal is continuously operatively connected with the temporarily inactive signal. It is sufficient, if the auxiliary signal is superimposed on the temporarily inactive signal only at the moment of change-over of the action of the independent main signals on the motor operator.

I claim:

1. Automatic control method in which a motor operator is selectively actuated by at least two independent control signals whereby the selected signal is operatively connected to the motor operator and the unselected signal is disconnected from the motor operator, the method comprising producing an auxiliary signal corresponding to the difference between the energy of the signal which is operatively connected with the motor operator and the signal which is disconnected from the motor operator, and superimposing said auxiliary control signal on the signal, which is temporarily disconnected from the motor operator, at least during the time said last mentioned signal is operatively reconnected to the motor operator.

2. Automatic control method as defined in claim 1 and including gradually reducing the auxiliary signal after disconnecting one independent signal from and connecting the other independent signal to the motor operator.

3. Automatic control system comprising a motor operator, at least two independent control signal producing means, signal conducting means individually connected to said signal producing means, change-over means operatively connected with said signal conducting means and with said motor operator for individually selectively operatively connecting one of said signal conducting means to said motor operator for actuating the latter, an auxiliary controller connectable with said signal conducting means for measuring the difference between the independent signals and producing an auxiliary signal corresponding to said difference, signal summing means interposed in at least one of said signal conducting means and operatively connected with said auxiliary controller for adding the auxiliary signal to the respective independent signal, whereby, upon connection by said change-over means of one of said signal conducting means to and disconnection of the other signal conducting means from said motor operator, the signals in both conducting means adjacent to said change-over means are substantially the same.

4. Automatic control system as defined in claim 3 including a signal energy accumulator interposed in the connection between said auxiliary controller and said signal summing means.

5. Automatic control system according to claim 4 including means connected with said energy accumulator for gradually reducing the accumulated energy.

References Cited in the file of this patent

UNITED STATES PATENTS

| | | |
|---|---|---|
| 2,588,799 | Booth | Mar. 11, 1952 |
| 2,638,117 | Horn | May 12, 1953 |
| 2,884,939 | Eller | May 5, 1959 |